United States Patent
Barbe et al.

Patent Number: 5,302,189
Date of Patent: Apr. 12, 1994

[54] MEMBRANE NITROGEN GAS GENERATOR WITH IMPROVED FLEXIBILITY

[75] Inventors: Christian Barbe, Fontenay aux Roses; Jean-Renaud Brugerolle, Paris, both of France

[73] Assignee: L'Air Liquide, Societe Anonyme pour l'Etude et l'Exploitation des Procedes Georges Claude, Paris, France

[21] Appl. No.: 935,169

[22] Filed: Aug. 26, 1992

[51] Int. Cl.$^5$ .............................. B01D 53/22
[52] U.S. Cl. .............................. 95/54; 95/22
[58] Field of Search .............. 55/16, 18, 68, 158; 95/22, 54, 47

[56] References Cited

U.S. PATENT DOCUMENTS

| | | | |
|---|---|---|---|
| 3,735,558 | 5/1973 | Skarstrom et al. | 55/158 X |
| 4,556,180 | 12/1985 | Manatt | 55/158 X |
| 4,806,132 | 2/1989 | Campbell | 55/16 |
| 4,818,254 | 4/1989 | Anand et al. | 55/16 |
| 4,838,904 | 6/1989 | Sanders, Jr. et al. | 55/158 |
| 4,840,646 | 6/1989 | Anand et al. | 55/16 |
| 4,851,014 | 7/1989 | Jeanes | 55/16 |
| 4,857,082 | 8/1989 | DiMartino, Sr. et al. | 55/16 |
| 4,874,401 | 10/1989 | Jeanes | 55/16 |
| 4,931,070 | 6/1990 | Prasad | 55/158 X |
| 4,944,776 | 7/1990 | Keyser et al. | 55/16 |
| 5,030,058 | 10/1991 | Mitariten | 55/18 X |
| 5,030,251 | 7/1991 | Rice et al. | 55/16 |
| 5,102,432 | 4/1992 | Prasad | 55/16 |
| 5,118,327 | 6/1992 | Nelson et al. | 55/16 |
| 5,125,937 | 6/1992 | Sadkowski et al. | 55/158 |
| 5,131,929 | 7/1992 | Brockmann et al. | 55/16 |

Primary Examiner—Robert Spitzer
Attorney, Agent, or Firm—Oblon, Spivak, McClelland, Maier & Neustadt

[57] ABSTRACT

A membrane nitrogen gas generator, containing a feed stream compressor, one or more filtering membranes, each having a permeate side and a non-permeate side, in fluid connection with and downstream of the feed stream compressor, and one or more product storage containers capable of storing a product having a higher purity than is required by customer demand, and which generator is capable of generating an increased flow rate during periods of high demand.

30 Claims, 2 Drawing Sheets

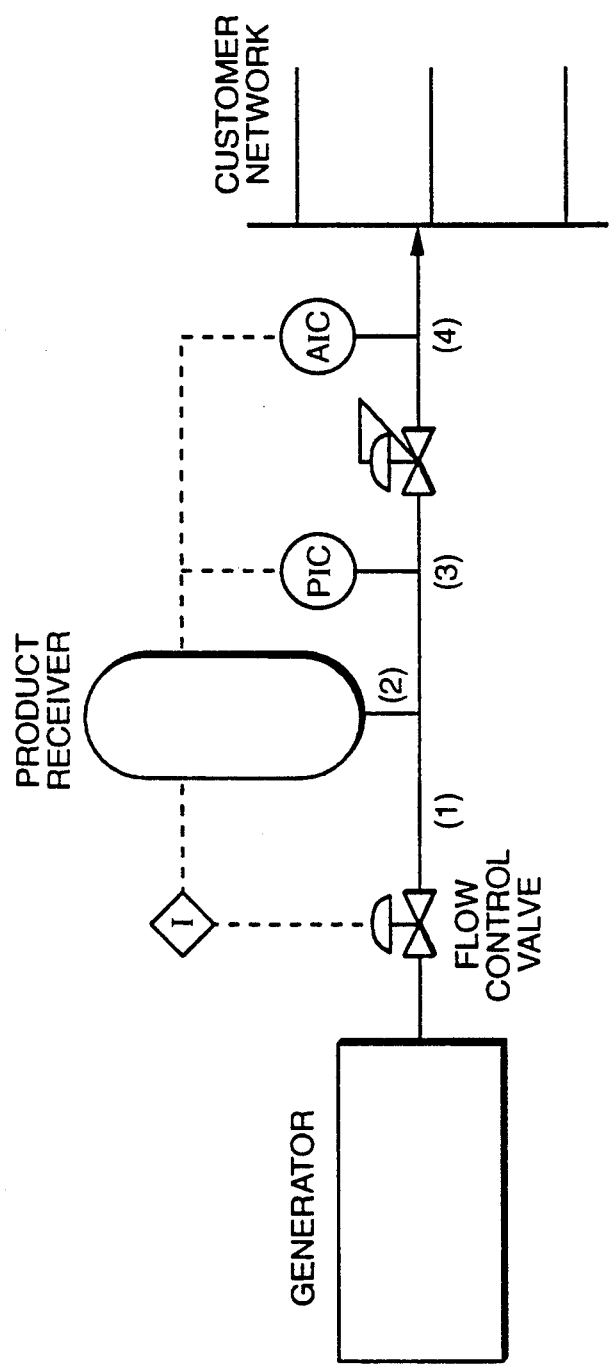
FIG._1

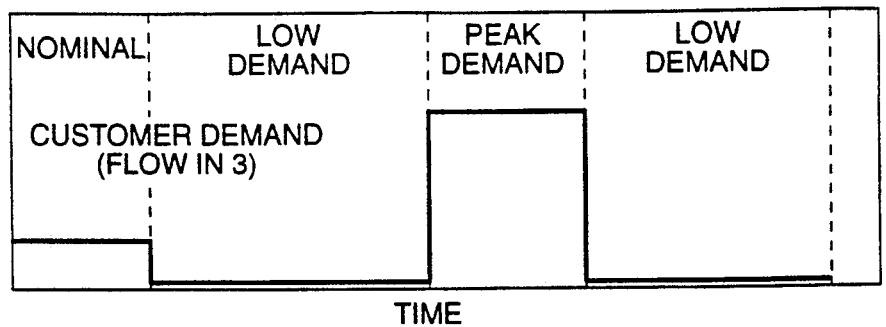
FIG._2A
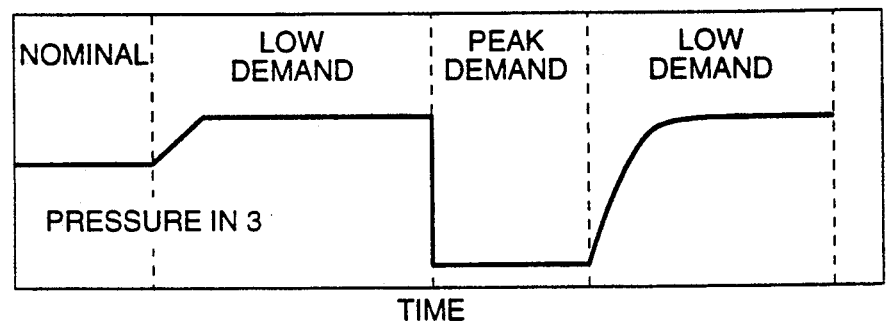
FIG._2B
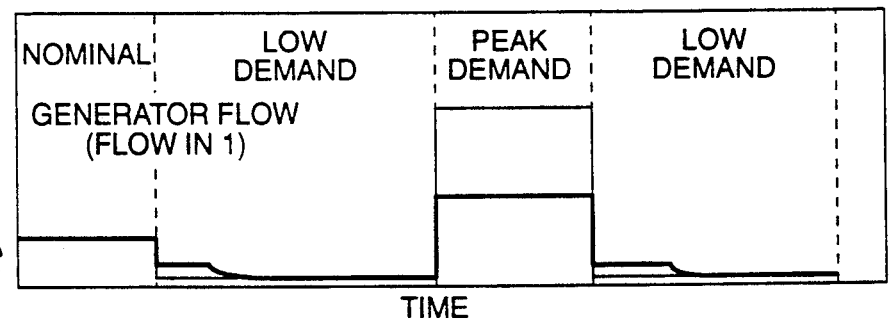
FIG._2C
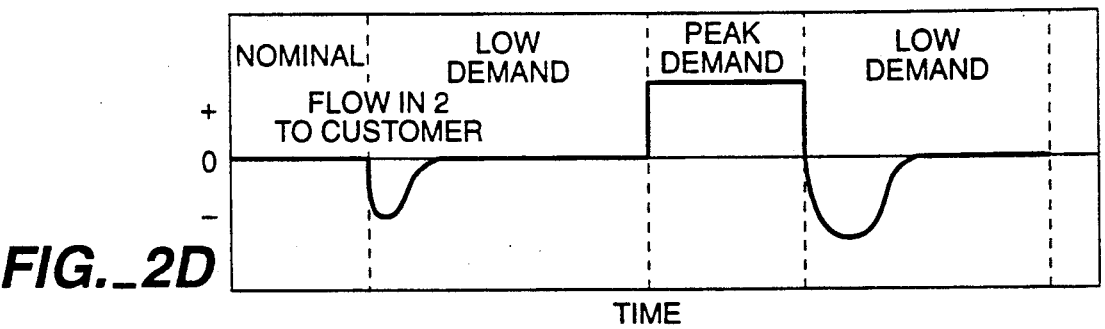
FIG._2D
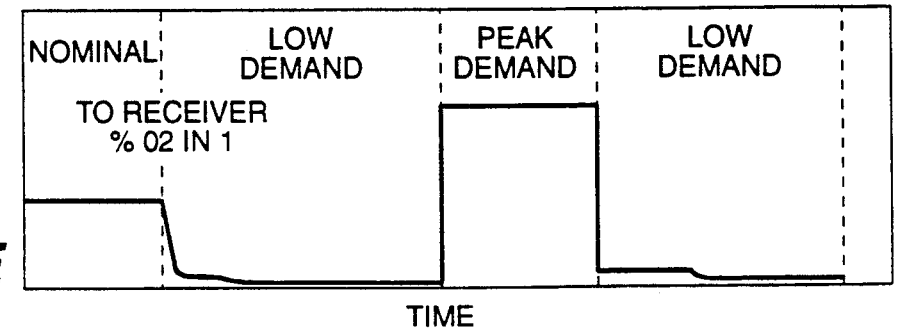
FIG._2E

MEMBRANE NITROGEN GAS GENERATOR WITH IMPROVED FLEXIBILITY

BACKGROUND OF THE INVENTION

1. Field of the Invention

The present invention relates to a membrane nitrogen gas generator with improved flexibility, which is capable of providing an increased flow rate during periods of high demand.

2. Description of the Background

Membrane processes are used with increasing frequency in the production of inert gases from atmospheric air, wherein the oxygen content in the feed air stream through the membrane is decreased by permeation to a low pressure side. Membrane nitrogen generators are most frequently used in cases where customer applications can withstand a small amount of oxygen in the atmosphere, such as, for example, from 0.5 to 5% by volume oxygen.

However, it is difficult to select an appropriate sized membrane generator for customer demand as it is not easily predicted. For example, customer demand patterns are generally not well known, and even if they are they may often change considerably both in the short term, such as, for example, at ten minute intervals, as well as in the long term, such as with the change of seasons and from one year to the next. Of course, this difficulty is not specific to membrane processes, but to any small on-site plant serving the needs of a single customer.

At present, one method of overcoming this difficulty is to produce inert atmospheres at a pressure higher than is required by customer demand and storing excess production in a buffer tank during load demand periods for release in peak demand periods. Another method entails the use of bulk storage tanks to supplement generator production during peak demands.

While these solutions address the problem of variable customer demand to some extent, however, it remains necessary to use an oversized generator when using these processes. Unfortunately, the overall process economy is thereby impaired, particularly when annual use of the facility is low.

Hence, a need exists for a membrane generator, particularly a membrane nitrogen generator, having an improved design which specifically addresses the needs of customers having high variable flow demand patterns in an economical manner, and, in particular, which is capable of providing an increased flow rate during periods of high demand.

SUMMARY OF THE INVENTION

Accordingly, it is an object of the present invention to provide a membrane nitrogen gas generator having an improved flexibility which is capable of meeting the needs of customers having highly variable flow demand patterns, and which is capable of providing an increased flow rate during periods of high demand.

It is also a particular object of the present invention to provide a membrane nitrogen generator which can efficiently meet the needs of a single customer from a small on-site plant.

The above objects and others which will become more apparent in view of the following disclosure are provided by a membrane nitrogen gas generator containing feed stream compressing means, one or more membrane filtering means in fluid connection with the compressing means, and one or more product storage receiver means in fluid connection with and downstream of the one or more membrane filtering means, whereby excess production may be stored in periods of low demand at a purity level which is higher than required by customer need.

BRIEF DESCRIPTION OF THE DRAWINGS

FIG. 1 illustrates a generator and control means, including a product receiver, in accordance with the present invention.

FIGS. 2a–e) represent a series of time diagrams which illustrate the operation of the present invention, by monitoring several parameters as indicated as a function of variable customer demand.

DETAILED DESCRIPTION OF THE PREFERRED EMBODIMENTS

The present invention provides a membrane nitrogen gas generator, with improved flexibility containing at least one product storage receiver which is capable of storing excess production in periods of low demand at a purity level which is higher than that required by customer need. The present invention is predicated upon the discovery that by utilizing one or more gaseous or liquid product storage receivers containing such high-purity nitrogen product, for example, generation of product nitrogen may be boosted at periods of peak demand to produce nitrogen having an oxygen content deemed acceptable by the customer. In particular, the lower purity nitrogen produced by the generator is mixed with stored high-purity product, having an oxygen content under the maximum value deemed acceptable by the customer, whereby the final product meets customer specifications with respect to both quantity and quality.

Generally, as used herein, for a generator with a nominal capacity of 100 units, for example, or for a customer with an average consumption of 100 units, for example, the term "peak demand" means a flow rate of about 120 to 1,000 units, whereas the term "low demand" means a flow rate of about 80 to 20 units or even less.

Furthermore, as used herein, the term "high purity product" or "improved purity product" means product the oxygen content of which is equal to nominal oxygen content, as requested by a customer, divided by a factor n, where n may have any value larger than 1, preferably between about 1.2 and 20.

Additionally, nitrogen with an oxygen content "over maximum value accepted by a customer" means product the oxygen content of which is equal to nominal oxygen content, as requested by the customer, multiplied by a factor m, where m may have any value larger than 1, preferably between about 1.2 and 3.

Generally, in accordance with the present invention, one or more product storage receivers are used to store excess product, for example nitrogen, in periods of low demand at a purity level which is enhanced relative to customer need. Then, at periods of high or peak demand, generator production is boosted by increasing the oxygen content of the nitrogen, produced for example, over the maximum value acceptable by the customer. The low purity generator product is then mixed with stored product of high purity to afford a final product which meets customer specifications with respect to both quantity and quality.

Generally, the phrase "boosting generator production" is intended to refer to a generator production having a value equal to about 1.1 to 5 times nominal production as a result of increasing the oxygen content in the product by a factor of about 2 to 8.

The present invention also becomes increasingly advantageous as the capacity of the membrane nitrogen generator increases when the acceptable oxygen content increases also.

While any type of membrane may be used, the present invention is of particular advantage when using hollow fiber tube-fed membranes in a counter-current operating mode. Such membranes are known to those skilled in the art. Under such circumstances, for example, a surprising phenomenon is observed. Notably, the oxygen content increase due to production increase is much less than would be expected for shell-fed modules operated in a perfect counter-current mode. This phenomenon is particularly striking for large size industrial modules.

Those skilled in the art will appreciate that various changes and modifications can be made in the details of the invention without departing from the scope of the invention as set forth in the appended claims. Thus, the permeable membranes employed in the practice of the invention will commonly be employed in membrane assemblies typically positioned without enclosures to form a membrane module comprising the principal element of a membrane system. As understood with reference to the invention, a membrane system comprises a membrane module or a number of such modules, arranged for either parallel or series operation. The membrane modules can be constructed in convenient hollow fiber form, or in spiral wound, pleated flat sheet membrane assemblies, or in any other desired configuration. Membrane modules are constructed to have a feed air surface side and an opposite permeate gas exit side. For hollow fiber membranes, the feed air can be added either to the bore side or to the other surface side of the hollow fibers.

It will also be appreciated that the membrane material employed for the air separation membrane and for the hydrogen purification membrane can be any suitable material capable of selectively permeating a more readily permeable component of the feed gas, i.e., air or impure hydrogen. Cellulose derivatives, such as cellulose acetate, cellulose acetate butyrate and the like, polyamides and polyimides, including aryl polyamides and aryl polyimides; polysulfones; polystyrenes and the like, are representative of such materials. However, in accordance with the present invention, polyimides are preferred.

As indicated above, the permeable membranes comprising the membrane system positioned within the insulated enclosure of the invention may be in any desirable form, with hollow fiber membranes being generally preferred. It will be appreciated that the membrane material employed in any particular gas separation application can be any suitable material capable of selectively permeating a more readily permeable component of a gas or fluid mixture containing a less readily permeable component. Cellulose derivatives, such as cellulose acetate, cellulose acetate butyrate, and the like; polyamides and polyimides, including aryl polyamides and aryl polyimides; polysulfones; polystyrenes and the like, are representative examples of such materials. It will be understood in the art that numerous other permeable membrane materials are known in the art and suitable for use in a wide variety of separation operations. As noted, the membranes, as employed in the practice of the invention, may be in composite membrane form, in asymmetric form or in any such form that is useful and effective for the particular gas separation being carried out using the system and process of the invention.

The hollow fiber membranes are generally formed from a polymeric material which is capable of separating one or more fluids from one or more other fluids in a fluid mixture. The polymeric materials which may be used to prepare the hollow fiber membranes preferably include olefinic polymers, such as poly-4-methylpentene, polyethylene, and polypropylene; polytetrafluoroethylene; cellulosic esters, cellulose ethers, and regenerated cellulose; polyamides; polyetherketones and polyetheretherketones; polyestercarbonates and polycarbonates; polysulfones; polyimides; polyethersulfones; and the like. The hollow fiber membranes may be homogeneous, symmetric (isotropic), asymmetric (anisotropic), or composite membranes. The membranes may have a dense discriminating region which separates one or more fluids from one or more other fluids based on differences in solubility and diffusivity of the fluids in the dense region of the membrane. Alternatively, the membranes may be microporous and separate one or more fluids from one or more other fluids based on relative volatilities of the fluids.

Hollow fiber membranes with dense regions are preferred for gas separations. Asymmetric hollow fiber membranes may have the discriminating region either on the outside of the hollow fiber, at the inside (lumen surface) of the hollow fiber, or located somewhere internal to both outside and inside hollow fiber membrane surfaces. In the embodiment wherein the discriminating region of the hollow fiber membrane is internal to both hollow fiber membrane surfaces, the inside (lumen) surface and the outside surface of the hollow fiber membrane are porous, yet the membrane demonstrates the ability to separate gases. In the embodiment wherein gases are separated, the preferred polymeric materials for membranes include polyestercarbonates, polysulfones, polyethersulfones, polyimides, and the polycarbonates. More preferred polymeric materials for gas separation membranes include polycarbonates and polyestercarbonates. Preferred carbonate and polyestercarbonate membranes for gas separation include those described in U.S. Pat. Nos. 4,874,401, 4,851,014, 4,840,646, and 4,818,254; the relevant portions of each patent incorporated herein by reference for all legal purposes which may be served thereby. In one preferred embodiment, such membranes are prepared by the process described in U.S. Pat. No. 4,772,392, the relevant portions incorporated herein by reference for all legal purposes which may be served thereby.

In order to emphasize the surprising advantage of the present invention, the following observations have been made with industrial modules.

TABLE 1

| Normalized Production flow | % $O_2$ ideal module | % $O_2$ industrial module |
|---|---|---|
| 100 | 0.1 | 0.1 |
| 172 | 0.5 | 0.47 |
| 228 | 1 | 0.87 |
| 317 | 2 | 1.65 |
| 574 | 5 | 3.93 |

The above table includes data from industrial size module performance and shows that increased flow in an existing plant, assuming that sufficient air feed is available, has much less impact on product purity than would be expected based on computer simulation. This helps boost system production in case of customer consumption surge when advantage is taken of pure nitrogen stored while customer consumption is less than nominal generator production.

Generally, the membrane nitrogen generator of the present invention contains compressing means, one or more membrane filtering means in fluid connection with and downstream of the compressing means, and one or more product storage receiver means in fluid connection with and downstream of the membrane filtering means, which is capable of storing product during periods of low demand having a superior purity, i.e., nitrogen having a reduced oxygen content, relative to customer need.

The membranes used in accordance with the present invention may be any conventional membrane or membranes having permeate and non-permeate sides which is or are capable of separating nitrogen from atmospheric air or from mixtures of nitrogen and oxygen. However, it is generally preferred that the membrane or membranes be hollow fiber tube-fed membranes which are used in a counter-current mode.

Preferably, the present generator also includes air conditioning means downstream of the compressing means but upstream of the membrane for removal of oil, dust and other contaminants, such as carbon dioxide and water vapor. Generally, conventional compressing means and air conditioning means may be used.

As already noted, one or more product receiver means may be used. For example, multiple product receiver means, such as two, three or four, may be advantageous in maintaining purity control. However, in most instances, one product receiver means is sufficient. For example, a tank or other reservoir or container means may be used. Further, storage means for either gas or liquid may be used.

Having generally described the present invention, reference will now be made to certain examples which are provided solely for purposes of illustration and which are not intended to be limitative.

EXAMPLE 1

|  | Nominal | Low Demand | Peak demand |
|---|---|---|---|
| Generator output: | | | |
| (flow rate (nm$^3$/h) | 100 | 28 | 190 |
| % oxygen in output | 2 | 0.1% | 4.85% |
| product pressure bar | 10 | 10.5 | 9.5 |
| Customer demand: | | | |
| flow rate (Nm$^3$/h) | 100 | 10 | 490 |
| % oxygen requested | 2 | 2 | 2 |
| product pressure required bar | 3 | 3 | 3 |
| Product receiver: | | | |
| volume (m$^3$) | 20 | | |
| product volume stored (Nm$^3$) in low demand mode | | 150 | |

In referring to FIG. 1, it is seen that the generator is set in the normal or nominal mode through flow control valve and other control means, such as control means for air compressor flow and pressure, and membrane temperature, for example, to produce 100 Nm$^3$/h product at 2% oxygen. Flow in 3 equals flow in 1, with no net flow in 2. A product receiver is not used.

PIC means a pressure (P) is available as an indicator or display (I) and is fed to a controller or computer. AIC means a gas analysis (A) is available on an indicator or display (I) and is fed to a controller or computer. PLC means a programmable logic controller, i.e. an industrial computer dedicated to process control functions.

In a low demand mode, flow in 4 is low so that pressure in 3 will increase as a result of generator production. Based upon pressure read in PIC, computer, or PLC, flow control means, such as a valve, effects flow control so that production flow from the generator will decrease and the oxygen content in the product will decrease. Excess product will be stored in one or more product receivers until maximum present pressure level (PSH) is reached. Production will then either stop or adjust to customer demand.

In a high demand mode, flow in 4 is high so that pressure in 3 will decrease as a result of insufficient generator production. At the same time product stored previously in the receiver will be released to line 3 as a result of pressure lowering in 3. Based on pressure read in PIC, computer, or PLC, flow control means will adjust the control valve so that production from the generator will increase and oxygen content in product will increase up to a maximum value set by computer in such way that mixture of pure product from receiver and product from generator will give in 3 a total product with O2 content equal to customer requirement (2% in the example).

FIG. 2 will now be referred to in order to further illustrate the present invention.

FIG. 2 represents time diagrams illustrating the relationship between several parameters, such as (using notation from FIG. 1) flow in line 3, pressure in line 3, flow in line 1, flow in line 2 and % oxygen in line i versus variable customer demand.

Specifically, FIG. 2a) illustrates the relationship between customer demand (flow in line 3) as a function of nominal, low demand, peak demand and return to low demand.

FIG. 2b) illustrates the relationship between customer demand (pressure in line 3) as a function of nominal, low demand, peak demand and return to low demand.

FIG. 2c) illustrates the relationship between customer demand (flow in line 1) as a function of nominal, low demand, peak demand and return to low demand.

FIG. 2d) illustrates the relationship between customer demand (flow in line 2) as a function of nominal, low demand, peak demand and return to low demand.

FIG. 2e) illustrates the relationship between customer demand (% oxygen in line 1) as a function of nominal, low demand, peak demand and return to low demand.

EXAMPLE 2

A comparison is now provided between using the present invention, and using the same generator and buffer tank without using the present invention:

a) when using the present invention, peak demand of customer (490 Nm$^3$/h during 30 minutes) is met by adding stored gas (150 Nm$^3$ stored at 0.1%) delivered during 30 minutes, thus giving a flow-rate of 300 Nm$^3$/h plus generator production in boost mode = 190 Nm$^3$/h at 4.85%. This affords 490 Nm$^3$/h at 1.94% O$_2$ during 30 minutes.

b) using the same generator and the same buffer tank, without using the present invention, peak demand of 490 Nm³/h is met by adding stored gas (140 Nm³ at 2%) plus 100 Nm³/h at 2% from generator, which affords 490 Nm³/h at 2% O₂ during 21 minutes.

Thus, the present invention provides the surprising benefit of a 43% increase in the time where customer peak demand can be satisfied with given equipment.

EXAMPLE 3

Assuming that a generator has been run at improved purity (and decreased flow rate), while customer demand was low and that stored product volume is V at a purity n/x, x being the nominal purity required by customer.

Let it be assumed that during a consumption surge, the customer requires a total product quantity equal to V+kV, V being delivered as improved purity product stored in a receiver, and kV being production by generator at oxygen content y.

An oxygen mass balance shows that:

$$\frac{Y}{x} = \left(1 + k - \frac{1}{n}\right)\frac{1}{k}$$

This simple formula gives following numerical results:

| Stored product purity | $\frac{Y}{x} = \frac{\text{generator product purity in surge mode}}{\text{product purity required by customer}}$ | | | | | |
|---|---|---|---|---|---|---|
| | k = 1 | k = 1.5 | k = 2 | k = 3 | k = 5 | k = 10 |
| x/20 | 1.95 | 1.633 | 1.475 | 1.317 | 1.19 | 1.095 |
| x/10 | 1.90 | 1.60 | 1.45 | 1.300 | 1.18 | 1.090 |
| x/5 | 1.80 | 1.533 | 1.40 | 1.266 | 1.16 | 1.080 |
| x/2 | 1.50 | 1.333 | 1.25 | 1.166 | 1.10 | 1.050 |

The above table shows that when pure product is stored during low demand periods, it is then possible to feed customer during peak period with product made by mixing previously stored pure product and a larger quantity of less pure product.

As an example, if purity required by customer is 1% O₂, and if product is stored at 0.1% purity during off-peak period, it is then possible during peak period to recover stored product plus a quantity produced at purity:
1.9% O2 for volume equal to stored volume × 1
1.5% O2 for volume equal to stored volume × 1.5
1.09% O2 for volume equal to stored volume × 10

Selection of adequate purity is made depending on the generator flow/purity relationship. For example, a typical membrane generator sized for production of 100 Nm³/h at 1% O₂ is capable of producing 141 Nm³/h, i.e., 2.82 times nominal rate for 42 minutes if 100 Nm³ at 0.1% have previously been stored during low demand periods.

EXAMPLE 4

As an alternative membrane generator design, a back-up liquid nitrogen storage is used. This is more expensive, however, due to the cost of liquid nitrogen delivered on-site, and of a liquid nitrogen cold converter.

EXAMPLE 5

As another alternative, a product of nominal purity may be stored in a receiver tank. However, in order to ensure the same flow and same product quantity, the storage receiver must be capable of storing 130 m³ at nominal purity.

Thus, the present invention provides a method of generating a gas, such as nitrogen, for example, with improved flexibility, which generally entails first generating nitrogen from a membrane nitrogen generator, such that nitrogen having an enhanced purity relative to customer demand is produced during periods of low demand, and then storing this nitrogen in one or more product storage tanks or receivers. Thereafter, during periods of high demand, nitrogen is produced having a purity which is below that which meets customer demand, and which is then mixed with the stored nitrogen having a higher purity, thereby meeting customer requirements of quantity and quality. Importantly, the present generator affords an increased flow rate during periods of high or peak demand.

Generally, in accordance with the present invention any type of membrane may be used which is conventionally used to generate the gas of interest, such as nitrogen gas.

Furthermore, the pressures for the generator and product receiver may be generally in the range of about 1 to 50 bar, preferably in the range of about 6 to 14 bar. Moreover, while the product and receiver temperature are inconsequential, they may be generally in the range of about 0° C. to about 100° C., preferably about 10° C. to about 60° C.

The present invention thus provides, in part, and in particular, a membrane nitrogen generator containing feed stream compressing means; one or more membrane filtering means each having a permeate side and a non-permeate side, in fluid connection with and downstream of the feed stream compressing means; and one or more product storage means for storing product nitrogen having a higher purity than is required by customer need, the product storage means being in fluid connection with and downstream of the membrane filtering means.

Additionally, while the phrase "higher purity than is required by customer need" generally refers to a lower content of any component than is normally required by the customer, the component most often is oxygen. Thus, the higher purity will often refer to a lower oxygen content than is acceptable by the customer.

The present invention also provides, in part, and in particular, a method of generating nitrogen with improved flexibility, which entails generating nitrogen from a membrane nitrogen generator, such that nitrogen having an enhanced purity relative to that which is acceptable by a customer is produced during periods of low generator demand; storing the nitrogen having enhanced purity in one or more product storage means; and mixing the stored nitrogen from the storage means with product having a lower purity than the stored nitrogen, the lower purity nitrogen being produced during periods of high generator demand, to produce a final mixture acceptable to customer specifications.

Furthermore, the present invention also provides, in part, a method for increasing generator flow rate during a period of increased demand, which entails producing a lower purity gas than is required, and mixing therewith a stored gas having a higher purity than is required, to produce an increased flow rate of product, which is acceptable to customer specifications.

The present invention also provides a method for increasing generator flow rate of nitrogen during a period of increased or peak demand, which entails generating nitrogen from a membrane nitrogen generator, whereby nitrogen having an enhanced purity relative to that which is deemed acceptable by a customer is produced during periods of low generator demand; storing the nitrogen having enhanced purity in one or more product storage means; and mixing the stored nitrogen from the storage means with product having a lower purity than the stored nitrogen, the lower purity nitrogen being produced during periods of high generator demand, to produce a final mixture acceptable to customer specifications.

Additionally, the present invention also provides an efficient means of customer load tracking.

Generally, while customer demand for quantity and quality of product gas will vary, for a nitrogen product, for example, customer demand will typically necessitate a final product oxygen content of no more than about 5% by volume of oxygen, preferably no more than about 2% by volume of oxygen therein.

Conventional design is such that variations in customer demand are imperfectly taken into account. For example, a start/stop mode does not provide an efficient way to meeting long peak demands.

U.S. Pat. No. 4,806,132 provides a method of turndown control which makes it possible to produce the exact quantity of nitrogen required without stopping the unit. This, however, makes a poor use of the separation capacity installed on-site and does not make any provision for meeting long peak demands. The present invention makes maximum use of installed separation capacity and, thus, provides a more efficient customer load tracking.

Having described the present invention, it will be apparent that many changes and modifications may be made to the embodiments described above without departing from the spirit and scope of the present invention.

What is claimed as new and desired to be secured by Letters Patent of the United States is:

1. A method of generating nitrogen with improved flexibility, which comprises:
   (a) generating a first nitrogen gas from a membrane nitrogen generator, said gas being of higher purity than required by customer demand during periods of low generator demand,
   (b) storing said first nitrogen gas having higher purity in one or more product storage means, and
   (c) mixing said stored first nitrogen gas from said one or more storage means with a second nitrogen gas having a lower purity than said stored first nitrogen gas, said lower purity gas being produced during periods of high generator demand, to produce an increased flow rate of final product which has a purity higher than that which would be produced by the generator alone at the same flow rate.

2. The method of claim 1, wherein one product storage means is used.

3. The method of claim 2, wherein said product storage means is a gaseous product storage means.

4. The method of claim 1, wherein said higher purity of said first nitrogen gas and said final product nitrogen gas comprises an oxygen content in said first nitrogen gas and said final product nitrogen gas which is lower than an acceptable oxygen content thereof.

5. The method of claim 4, wherein said lower oxygen content equals oxygen content required by a customer divided by a factor n, where n is from about 1.2 to 20.

6. The method of claim 1, wherein said low generator demand comprises about 80 units or less of generator output.

7. The method of claim 1, wherein said high generator demand comprises about 120 units or more of generator output.

8. The method of claim 1, wherein said lower purity gas produced during periods of high generator demand is produced by boosting generator production to a value of about 1.1 to 5 times nominal production by increasing the oxygen content in the product by a factor of about 2 to 8.

9. The method of claim 1, wherein said membrane nitrogen generator comprises a membrane system, which comprises one or more membrane modules arranged in parallel or in series.

10. The method of claim 9, wherein the one or more membrane modules comprise hollow fiber, spiral wound, or pleated flat sheet membranes.

11. The method of claim 10, wherein said membranes are made of a material selected from the group consisting of cellulose acetate, cellulose acetate butyrate, polyamides, polyimides, polysulfones and polystyrenes.

12. The method of claim 11, wherein said membrane is made of polyimide.

13. The method of claim 10, wherein said hollow fiber membranes are homogeneous, symmetric, asymmetric or composite fiber membranes.

14. The method of claim 13, wherein said hollow fiber membranes are asymmetric membranes and have a dense discriminating region which separates one or more fluids from one or more other fluids based upon differences in solubility and diffusivity of the fluids in the region.

15. The method of claim 13, wherein said hollow fiber membranes are made of a material selected from the group consisting of polyestercarbonates, polysulfones, polyethersulfones, polyimides and polycarbonates.

16. A method for increasing generator flow rate of nitrogen during a period of increased demand, which comprises:
   (a) producing a first nitrogen gas of higher purity than is required by customer demand during period of low demand, and storing the product in one or more product storage means,
   (b) producing a second nitrogen gas of a lower purity than is required by customer demand during periods of high demand, and
   (c) mixing said first and second nitrogen gas products during said period of increased demand to produce an increased flow rate of final product which has a purity higher than that which would be produced by the generator alone at the same flow rate.

17. The method of claim 16, wherein one product storage means is used.

18. The method of claim 17, wherein the product storage means is a gaseous product storage means.

19. The method of claim 17, wherein said high generator demand comprises about 120 units or more of generator output.

20. The method of claim 16, wherein the higher purity comprises an oxygen content lower than an acceptable oxygen content.

21. The method of claim 20, wherein said lower oxygen content equals required oxygen content divided by a factor n, where n is from about 1.2 to 20.

22. The method of claim 16, wherein said low generator demand comprises about 80 units or less of generator output.

23. The method of claim 16, wherein said lower purity gas produced during periods of high generator demand is produced by boosting generator production to a value of about 1.1 to 5 times nominal production by increasing the oxygen content in the product by a factor of about 2 to 8.

24. The method of claim 16, wherein said nitrogen generator comprises a membrane system, which comprises one or more membrane modules arranged in parallel or in series.

25. The method of claim 24, wherein the one or more membrane modules comprise hollow fiber, spiral wound, or pleated flat sheet membranes.

26. The method of claim 25, wherein said membranes are made of a material selected from the group consisting of cellulose acetate, cellulose acetate butyrate, polyamides, polyimides, polysulfones and polystyrenes.

27. The method of claim 26, wherein said membrane is made of polyimide.

28. The method of claim 25, wherein said hollow fiber membranes are homogeneous, symmetric, asymmetric or composite.

29. The method of claim 28, wherein said hollow fiber membranes are asymmetric membranes and have a dense discriminating region which separates one or more fluids from one or more other fluids based upon differences in solubility and diffusivity of the fluids in the region.

30. The method of claim 28, wherein said hollow fiber membranes are made of a material selected from the group consisting of polyestercarbonates, polysulfones, polyether sulfones, polyimides and polycarbonates.

* * * * *